United States Patent [19]

Toyota et al.

[11] 4,085,276

[45] * Apr. 18, 1978

[54] PROCESS FOR PREPARING HIGHLY STEREOREGULAR POLYMERS OR COPOLYMERS OF α-OLEFINS CONTAINING AT LEAST THREE CARBON ATOMS, AND CATALYSTS USED THEREFOR

[75] Inventors: Akinori Toyota, Iwakuni; Kiyoshi Odawara, Waki; Norio Kashiwa, Iwakuni, all of Japan

[73] Assignee: Mitsui Petrochemical Industries Ltd., Tokyo, Japan

[*] Notice: The portion of the term of this patent subsequent to Feb. 28, 1993, has been disclaimed.

[21] Appl. No.: 656,980

[22] Filed: Feb. 10, 1976

[30] Foreign Application Priority Data

Feb. 14, 1975 Japan .................................. 50-17934

[51] Int. Cl.² .......................... C08F 4/02; C08F 10/06
[52] U.S. Cl. ................................ 526/122; 252/429 B; 252/429 C; 526/125; 526/127; 526/128; 526/351
[58] Field of Search ....................... 252/429 B, 429 C; 526/122, 125

[56] References Cited

U.S. PATENT DOCUMENTS

| | | | |
|---|---|---|---|
| 3,642,746 | 2/1972 | Kashiwa et al. | 526/125 |
| 3,718,636 | 2/1973 | Stevens et al. | 526/125 |

FOREIGN PATENT DOCUMENTS

| | | |
|---|---|---|
| 2,346,471 | 4/1974 | Germany. |
| 2,355,886 | 5/1974 | Germany. |
| 2,230,672 | 12/1972 | Germany. |
| 1,335,887 | 10/1973 | United Kingdom. |

*Primary Examiner*—Edward J. Smith
*Attorney, Agent, or Firm*—Sherman & Shalloway

[57] ABSTRACT

Highly stereoregular polymers or copolymers of α-olefins containing at least 3 carbon atoms are prepared in high yields by polymerizing or copolymerizing the α-olefins in the presence of a catalyst composed of (a) an improved solid transition metal catalyst component prepared by reacting (1) a magnesium-containing reaction product derived from a member of the group consisting of (i) a magnesium halide, (ii) an active hydrogen-containing compound, (iii) an organic acid ester and (iv) a silicon or tin compound containing at least one halogen atom or hydrocarbon group bonded directly to silicon or tin with (2) a titanium compound, and (b) an organometallic compound of a metal selected from aluminum, magnesium and zinc.

21 Claims, No Drawings

PROCESS FOR PREPARING HIGHLY STEREOREGULAR POLYMERS OR COPOLYMERS OF α-OLEFINS CONTAINING AT LEAST THREE CARBON ATOMS, AND CATALYSTS USED THEREFOR

This invention relates to a process for preparing highly stereoregular polymers or copolymers in high yields by polymerizing or copolymerizing an α-olefin containing at least 3 carbon atoms or copolymerizing an α-olefin containing at least 3 carbon atoms with not more than 10 mole% of ethylene in the presence of a catalyst composed of a specific solid transition metal catalyst component and an organometallic compound of a metal of Groups I to III of the periodic table.

Some suggestions have already been made to polymerize or copolymerize α-olefins in the presence of a catalyst composed of (a) a transition metal catalyst component derived from a solid carrier, an electron donor and a titanium compound and (b) an organometallic compound of a metal of Groups I to III of the periodic table. The present invention is an improved invention of selective nature over the inventions previously suggested by one or more of the inventors of the present invention with or without co-workers.

One of the suggestions relates to the polymerization or copolymerization of olefins in the presence of a catalyst composed of (a) a transition metal catalyst component prepared by reacting a titanium or vanadium compound, a solid carrier of an adduct formed between a magnesium dihalide and an electron donor and a compound of Si or Sn selected from the group consisting of halogen compounds of Si, halogen compounds of Sn, organohalogen compounds of Si and organohalogen compounds of Sn, and (b) an organometallic compound catalyst component of a metal of Groups I to III of the periodic table (West German OLS No. 2,355,886 laid open on May 16, 1974). This suggestion exemplifies aliphatic alcohols, aliphatic carboxylic acids, aliphatic carboxylic acid esters, aromatic carboxylic acid esters, aliphatic ketones and aromatic ketones as the electron donor, but fails to disclose anything about the conjoint use of the carboxylic acid esters and active hydrogen-containing compounds such as the aforesaid alcohols and carboxylic acids. None of the working examples given in this suggestion show such a conjoint use.

A method for obtaining excellent stereoregular polymers or copolymers has also been known which comprises polymerizing or copolymerizing α-olefins containing at least 3 carbon atoms in the presence of a catalyst composed of (A) a titanium-containing solid catalyst component consisting of an organic complex derived from a magnesium halide, a specific silicon component, an organic carboxylic acid ester and a titanium compound, and (B) an organoaluminum catalyst component (west German OLS No. 2,504,036 laid open on Aug. 7, 1975). This patent is also silent on the conjoint use of the carboxylic acid ester and the active hydrogen-containing compound such as the alcohols or carboxylic acids, and neither gives specific working examples covering such conjoint use.

West German OLS No. 2,153,520 [laid open on May 4, 1972; corresponding to French Laid-Open Patent Publication No. 2,113,313 (May 29, 1972)] discloses a process for selectively preparing either an atactic polymer as a main product or a stereoregular polymer as a main product. This Patent Publication states that when a Ti catalyst component obtained by contacting a titanium compound with a mixture of an active-type magnesium halide carrier and an anhydrous compound of an element of Groups I to IV, for example, Si or Sn, is used in the above process preferably in the form supported on a carrier and subsequently modified with an electron donor, a stereoregular polymer is obtained as a main product. This Publication, however, illustrates only $SiO_2$ and $SnCl_2$ as the anhydrous compound of Si or Sn. Furthermore, this Publication discloses that ethers, thioethers, amines, phosphines, ketones and esters can be utilized as the electron donors, but do not exemplify any specific compounds that fall within the esters. The isotacticity of the polymer shown by the boiling n-heptane extraction residue in all of the Examples of the above Patent Publication is at most about 70%, and therefore, the process of this patent is far from satisfactory for preparing highly stereoregular polymers. On the other hand, the electron donor used in this patent for production of isotactic polymers is only N,N',N'',N'''-tetramethylethylenediamine. Moreover, only anhydrous lithium chloride and $SiO_2$ are actually used in this patent as the anhydrous compound of an element of Groups I to IV.

We have made investigations with a view to providing an improved catalyst which can afford polymers and copolymers of α-olefins with at least 3 carbon atoms having more improved stereoregularity in high yields, and can be prepared without the need for the time-consuming mixing-pulverizing means employed in the second suggestion cited above for preparing the titanium-containing solid catalyst component. These investigations led to the discovery that the aforesaid catalyst composed of (a) a transition metal catalyst component derived from a solid carrier, an electron donor and a titanium compound and (b) an organometallic compound of a metal of Groups I to III of the periodic table can be easily improved by using, as the transition metal catalyst component (a) above, a solid product obtained by reacting (1) a magnesium-containing reaction product derived from a member of the group consisting of magnesium halides, active hydrogen-containing compounds, organic acid esters and compounds of Si or Sn containing at least one halogen atom or hydrocarbon group directly bonded to silicon or tin with (2) a titanium compound.

Accordingly, it is an object of this invention to provide an improved process for preparing improved highly stereoregular polyolefins.

Another object of this invention is to provide an improved catalyst for use in the process of this invention.

Many other objects and advantages of this invention will become more apparent from the following description.

The polymerization or copolymerization of α-olefins having at least 3 carbon atoms, as referred to in this application, includes homopolymerizations of α-olefins having at least 3 carbon atoms, copolymerizations of at least two of α-olefins having at least 3 carbon atoms, and copolymerizations of α-olefins having at least 3 carbon atoms with ethylene and/or diolefins in an amount of preferably up to 10 mole %.

Examples of the α-olefins are propylene, 1-butene, 4-methyl-1-pentene, and 3-methyl-1-butene, and examples of the diolefins include conjugated diolefins such as butadiene and non-conjugated dienes such as dicyclopentadiene, ethylideneorbornene and 1,5-hexadiene.

The catalyst used in this invention is composed of the following titanium-containing solid catalyst component (a) and organoaluminum catalyst component (b).

Component (A) consists of a magnesium-containing reaction product derived from (i) a magnesium halide, (ii) an active hydrogen-containing compound, (iii) an organic carboxylic acid ester, and (iv) a compound of Si or Sn containing at least one halogen atom or hydrocarbon group directly bonded to silicon or tin.

Desirably, the magnesium halide (i) as a constituent of the titanium-containing solid catalyst component (a) such as magnesium bromide, magnesium iodide, or preferably magnesium chloride is as anhydrous as possible, but the inclusion of moisture is permissible to an extent such that the moisture does not substantially affect the performance of the catalyst. The halide may be one obtained by dehydrating a commercially available grade at at 100° to 400° C. under reduced pressure prior to use.

The magnesium halide may be those halogenated magnesium compounds which are obtained by halogenating magnesium compounds such as Grignard reagents, magnesium salts of organic acids, or magnesium alcoholates. There can also be used products which are obtained by dissolving the magnesium halides described above in a polar solvent such as acetone or ether either alone or together with, for example, $AlCl_2$, $Al(OR)_nCl_{3-n}$ (in which R is a hydrocarbon group, and $n$ is a number greater than zero but not more than 3), or $GeCl_4$ which is soluble in the above solvent, and then evaporating off the solvent.

For convenience of use, the magnesium halide is preferably in the form of a powder having an average particle diameter of 1 to 50 microns. But when it is to be pulverized by a mechanical contacting treatment during catalyst preparation, powders of large particle size can also be used. The average particle diameter of 1 to 50 microns means that at least 80% by weight of the entire particles have a particle diameter of 1 to 50 microns.

Examples of the active hydrogen-containing compounds (ii) are aliphatic alcohols, preferably $C_{1-8}$, more preferably $C_{1-4}$, aliphatic alcohols such as methanol, ethanol, propanol or butanol; aromatic alcohols, preferably benzyl alcohol, phenethyl alcohol, cumyl alcohol, triphenyl carbinol, o-cresol, m-cresol, 2,6-dimethylphenol or β-naphthol; primary amines such as ethylamine, n-butylamine, sec-butylamine or aniline; secondary amines such as diethylamine, di-n-butylamine, or diphenylamine; and thiols such as ethyl mercaptan or thiophenol; aliphatic carboxylic acids such as acetic acid, propionic acid, valeric acid or acrylic acid; acid amides or acid imides of said aliphatic carboxylic acids such as formamide, acetamide or propionamide. Of these active hydrogen-containing compounds, preferred are the above-mentioned $C_1 - C_8$ aliphatic alcohols, and most preferred are $C_1-C_4$ aliphatic alcohols.

Examples of the organic carboxylic acid esters (iii) include esters formed between $C_1-C_8$, preferably $C_1-C_4$, saturated or unsaturated aliphatic carboxylic acids which may optionally be substituted by a halogen atom and alcohols selected from the group consisting of $C_1-C_8$, preferably $C_1-C_4$, saturated or unsaturated aliphatic primary alcohols, $C_3-C_8$, preferably $C_5-C_6$, saturated or unsaturated alicyclic alcohols and $C_1-C_4$ saturated or unsaturated aliphatic primary alcohols substituted by $C_6-C_{10}$, preferably $C_6-C_8$ aromatic groups or halogen atoms; esters formed between $C_7-C_{12}$, preferably $C_7-C_{10}$, aromatic monocarboxylic acids and alcohols selected from the group consisting of $C_1-C_8$, preferably $C_1-C_4$, saturated or unsaturated aliphatic primary alcohols, $C_3-C_8$, preferably $C_5-C_6$, saturated or unsaturated alicyclic alcohols and $C_1-C_4$ saturated or unsaturated aliphatic primary alcohols substituted by $C_6-C_{10}$, preferably $C_6-C_8$ aromatic groups or halogen atoms; and alicyclic carboxylic acid esters such as methyl cyclopentanecarboxylate, methyl hexahydrobenzoate, ethyl hexahydrobenzoate, methyl hexahydrotoluate and ethyl hexahydrotoluate.

Specific examples of the organic carboxylic acid esters (iii) include methyl acetate, ethyl acetate, ethyl propionate, methyl chloroacetate, methyl cyclohexanecarboxylate, methyl benzoate, ethyl benzoate, propyl benzoate, butyl benzoate, methyl toluate, ethyl toluate, butyl toluate, ethyl ethylbenzoate, methyl anisate, ethyl anisate, and ethyl chlorobenzoate. Of these, $C_1-C_4$ alkyl esters of benzoic acid or nuclearly substituted benzoic acid are preferred. The use of methyl benzoate, ethyl benzoate, methyl toluate or ethyl toluate is most preferred.

The Si or Sn compound (iv) containing at least one halogen atom or hydrocarbon group directly bonded to silicon or tin may contain a hydrogen atom or an alkoxy group, etc. Specific examples of the Si or Sn compound are silicon tetrahalides, tetraalkyl silicons, silicon alkylhalides, silicon alkyl hydrides, tin tetrahalides, tin dihalides, tin alkyl halides, and tin hydride halides. Of these, the silicon tetrahalides and tin tetrahalides, such as silicon tetrachloride or tin tetrachloride, are preferred. In the compound (iv), the alkyl group is preferably one containing 1 to 4 carbon atoms, and the halogen atom is preferably chlorine.

The titanium compound (2) to be reacted with the magnesium-containing reaction product (1) preferably includes compounds of the formula $Ti(OR^1)_nX_{4-n}$ wherein X is a halogen atom such as chlorine or bromine, $R^1$ is an alkyl group such as a $C_1-C_4$ alkyl group, and $n$ is a number of 0 to 4.

Specific examples of such titanium compounds (2) are titanium tetrahalides such as titanium tetrachloride, titanium tetrabromide or titanium tetraiodide, alkoxy titanium trihalides such as methoxy titanium trichloride, ethoxy titanium trichloride, n-butoxy titanium tribromide; dialkoxy titanium dihalides such as dimethoxy titanium dichloride, diethoxy titanium dichloride, di-n-butoxy titanium dichloride or diethoxy titanium dibromide; trialkoxy titanium monohalides such as trimethoxy titanium chloride, triethoxy titanium chloride, tri-n-butoxy titanium chloride and triethoxy titanium bromide; and tetraalkoxy titaniums such as tetramethoxy titanium, tetraethoxy titanium and tetra-n-butoxy titanium. Of these, the titanium tetrahalides, especially titanium tetrachloride, are preferred.

The molar ratio of the components (i)/(ii)/(iii)/(iv)/(2) used for the preparation of the catalyst component (a) is preferably 1/(20–0.1)/(20–0.005)/(at least 0.01)/(at least 0.01), more preferably 1/(6–0.1)/(3–0.1)/(20–0.2)/(100–0.1).

The order of addition of these catalyst ingredients and the method of contacting will be described below.

There are many modes in the sequence of addition and the method of addition, for example, addition at a time, portionwise addition, or addition of the ingredients in the form of an adduct, and only some of them will be shown below.

1. The magnesium halide (i) is pre-treated with the active hydrogen-containing compound (ii) and the organic acid ester (iii). Then, the treated product is reacted with the silicon or tin compound (iv). The reaction product is preferably washed with an inert solvent, and then treated by being suspended in the titanium compound (2) or its solution in an inert solvent.

2. The magnesium halide (i) is pre-treated with the active hydrogen-containing compound (ii). The pre-treated product is reacted with the silicon or tin compound (iv), and the resulting reaction product is treated with the organic acid ester (iii). The ester-treated product is preferably washed with an inert solvent, and then treated by being suspended in the titanium compound (2) or its solution in an inert solvent.

In the above pre-treating operation, the magnesium halide can be pre-treated with a compound selected from active hydrogen-containing compounds, organic acid esters and silicon or tin compounds by various methods capable of permitting the contacting of these compounds. The most preferred method, however, is one comprising suspending the magnesium halide in an inert hydrocarbon such as hexane, heptane, benzene, toluene or kerosene, adding the active hydrogen-containing compound and the silicon or tin compound to the suspension, stirring the mixture, and contacting the mixture with the organic acid ester. Usually, treatment at room temperature suffices, but it is generally preferred to perform the treatment at elevated temperatures. The upper limit of the treatnng temperature is usually below the lowest point of the boiling points at atmospheric pressure or decomposition points of the suspension, and the active hydrogen-containing compounds, the organic esters, and the silicon or tin compounds used for catalyst preparation. The upper limit can, in some cases, be set at a higher level by employing elevated pressures.

Usually, temperatures of about 0° C. to about 100° C. are used for the above treatment.

The magnesium halide so pre-treated is preferably suspended in an inert solvent such as hydrocarbons, and the silicon or tin compound or its solution in an inert solvent is added to the suspension. Generally, the reaction proceeds sufficiently at room temperature, and heating is not required. It is generally advantageous however to carry out the reaction at elevated temperatures, since it promotes the reaction. The reaction product contains unreacted materials, and therefore, is preferably washed with an inert solvent prior to contact with the titanium compound.

The reaction of the magnesium halide so treated with the titanium compound (the supporting reaction) can be carried out by contacting the treated magnesium halide with the titanium compound preferably in the presence of an inert solvent, for example at room temperature to 200° C. for 10 minutes to 5 hours. Then, the unreacted titanium compound is removed by filtration or decantation, and then washed with a suitable inert solvent such as hexane, heptane or kerosene to remove the unsupported titanium compound as much as possible.

The organometallic compound catalyst component (b) may, for example, be trialkyl aluminums, alkyl aluminum halides, alkyl aluminum alkoxides, alkyl aluminum aryloxides, alkyl aluminum hydrides, dialkyl zincs, dialkyl magnesiums, and alkyl magnesium halides, in which the alkyl is preferably an alkyl with 1 to 12 carbon atoms, and the halogen is preferably chlorine, bromine or iodine. Specific examples include triethyl aluminum, diethyl aluminum hydride, tripropyl aluminum, tributyl aluminum, diethyl aluminum chloride, diethyl aluminum bromide, diethyl aluminum ethoxide, diethyl aluminum phenoxide, ethyl aluminum ethoxychloride, and ethyl aluminum sesquichloride. Of these, the trialkyl aluminums such as triethyl aluminum or tributyl aluminum, the dialkyl aluminum hydrides such as diisobutyl aluminum hydride, and the dialkyl aluminum halides such as diethyl aluminum chloride are preferred.

The process of the present invention can be carried out in the presence or absence of a liquid inert organic solvent. For example, the polymerization or copolymerization in accordance with the process of this invention can be carried out in the liquid phase in the presence of a liquid olefin, or it can be carried out in the vapor phase for example in a fluidized catalyst bed. Preferably, the polymerization of olefins in accordance with this invention is carried out in an inert organic liquid medium or an inert organic solvent. The amount of the transition metal catalyst component (a) is preferably 0.0001 to 1.0 millimoles, more preferably 0.001 to 0.5 millimoles, calculated as the titanium atom per liter of the inert organic liquid medium. The amount of the organometallic compound catalyst component (b) is preferably such that the ratio of the metal atom of Groups I to III to Ti metal atom is 1/1 to 2000/1, more preferably 1/1 to 300/1.

The olefin polymerizing or copolymerizing reaction using the catalyst of this invention can be performed in the same way as in the case of olefin polymerization using the conventional Ziegler-type catalysts. The reaction is carried out in the substantial absence of oxygen and water. A suitable inert organic liquid medium, for example, an aliphatic hydrocarbon such as hexane, heptane or kerosene, is used, and an olefin and the catalyst, and if desired, another olefin and/or diolefin are fed into the medium, and then the polymerization or copolymerization is carried out.

The polymerization temperature may usually be 20° to 200° C., preferably 50° to 180° C. Generally, the reaction is carried out at a pressure of 1 to 50 Kg/cm$^2$, preferably 2 to 20 Kg/cm$^2$. Preferably, the reaction is performed at an elevated pressure. The control of the molecular weight distribution by the conjoint use of the catalyst composition of this invention and hydrogen is effective both for a batchwise process and for a continuous process in the preparation of polymers or copolymers in accordance with this invention.

The following Examples and Comparative Examples illustrate the present invention.

EXAMPLE 1

Preparation of Catalyst Component (a)

Commercially available anhydrous magnesium chloride (0.1 mole) was suspended in 0.3 liter of kerosene, and 0.6 mole of ethanol and 0.1 mole of ethyl benzoate were added to the suspension at room temperature. The mixture was stirred for 1 hour, and 0.6 mole of silicon tetrachloride was added dropwise at room temperature, followed by stirring the mixture for 1 hour. The solid portion of the resulting product was collected, and washed thoroughly with kerosene. The solid product was suspended in 0.3 liter of a kerosene solution containing 30 ml of titanium tetrachloride, and the reaction was carried out at 80° C. for 2 hours. After the reaction, the supernatant was removed by decantation, and the solid portion was washed with fresh ketosene. The resulting solid contained 38.5 mg of titanium and 595 mg of chlorine on the atomic basis per gram thereof.

Polymerization

An autoclave with an available volume of 2 liters was charged with 0.75 liter of kerosene, 0.375 millimole of triethyl aluminum and 0.0375 millimole calculated as titanium atom, of the catalyst component (a) prepared by the method set forth in the previous section. The mixture was heated to 70° C. Propylene was polymerized for 3 hours while feeding it into the autoclave so that the total pressure was maintained at 7 Kg/cm$^2$. The solid component of the resulting product was collected by filtration, washed with hexane, and then dried to afford 365 g of polypropylene as a white powder. The polymer had a boiling n-heptane extraction residue of 95.3% and an apparent density of 0.31 g/ml. On the other hand, concentration of the liquid portion gave 12.7 g of a solvent-soluble polymer.

The catalyst used had an average specific polymerization activity of 480 PP-g/Ti-mM.hr.atm.

EXAMPLES 2 TO 11

A catalyst component (a) was prepared in the same way as in Example 1 except that the combination of the alcohol, ester and silicon or tin compound was changed. Propylene was polymerized in the same way as in Example 1 using 0.05 millimole/liter, calculated as titanium atom, of the catalyst component (a) and each of the various organoaluminum compounds shown in Table 1. The results are shown in Table 1.

30 ml of titanium tetrachloride was added, and the mixture was heated to 100° C. and stirred for 2 hours. After the reaction, the mixture was decanted and the supernatant was washed throughly with fresh kerosene. The solid obtained by the reaction continued 36.5 mg of titanium and 600 mg of chlorine calculated as atoms per gram thereof.

Polymerization

Propylene was polymerized under the same conditions as in Example 1 except that 0.0375 millimole of the catalyst component (a) was used and 0.375 millimole of triisobutyl aluminum was used instead of 0.375 millimole of triethyl aluminum. As a result, 309 g of a white powdery polymer and 11.2 g of a solvent-soluble polymer were obtained. The powdery polymer had a boiling n-heptane extraction residue of 94.6%, and an apparent density of 0.31 g/ml. The average specific polymerization activity was 407 PP-g/Ti.mM.hr.atm.

COMPARATIVE EXAMPLE 1

When propylene was polymerized using a catalyst prepared in the same way as in Example 1 except that ethyl benzoate was not used, 138 g of a white powdery polymer and 76 g of a solvent-soluble polymer were obtained. The powdery polymer had a boiling n-heptane extraction residue of only 71.3% and an apparent density of less than 0.1 g/ml. The average specific polymerization activity was 272 PP-g/Ti.mM.hr.atm.

Table I

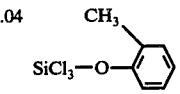

| Ex | Catalyst component (a) Materials | | | | | | Amount Supported | | Yield (g) | | Extraction residue of powder (%) | Apparent density (g/ml) | Average Specific polymerization activity (PP-g/Ti. mM.hr.atm) |
|---|---|---|---|---|---|---|---|---|---|---|---|---|---|
| | Alcohol | | Ester | | Si or Sn compound | | Ti (mg/g) | Cl (mg/g) | Powdery polymer | Soluble poly. mer | | | |
| | Name | mole | Name | mole | Name | mole | | | | | | | |
| 2 | Ethanol | 0.6 | Ethyl benzoate | 0.1 | SiCl$_3$H | 0.6 | 39.5 | 585 | 343 | 12.7 | 94.9 | 0.30 | 452 |
| 3 | Iso-propanol | 0.6 | Methyl benzoate | 0.1 | SiCl$_4$ | 0.6 | 41.5 | 575 | 356 | 14.5 | 94.3 | 0.30 | 470 |
| 4 | Octanol | 0.6 | Ethyl O-toluate | 0.1 | SiCl$_4$ | 0.6 | 40.6 | 580 | 335 | 14.4 | 94.4 | 0.30 | 444 |
| 5 | Ethanol | 0.6 | Ethyl benzoate | 0.2 | SnCl$_4$ | 0.5 | 40.5 | 570 | 315 | 10.0 | 94.4 | 0.29 | 413 |
| 6 | Ethanol | 0.5 | Ethyl benzoate | 0.2 | Sn(C$_2$H$_5$)$_4$ | 0.5 | 36.4 | 596 | 306 | 14.5 | 94.9 | 0.29 | 407 |
| 7 | Ethanol | 0.6 | Ethyl O-toluate | 0.04 | SiCl$_3$(OC$_2$H$_5$) | 0.4 | 40.0 | 585 | 308.5 | 14.4 | 94.0 | 0.30 | 410 |
| 8 | Ethanol | 0.6 | " | 0.04 | (see structure above) | 0.4 | 46.0 | 570 | 320.5 | 16.1 | 94.2 | 0.29 | 428 |
| 9 | Cumyl alcohol | 0.3 | " | 0.04 | SiCl$_4$ | 0.4 | 46.3 | 574 | 351.5 | 13.1 | 94.7 | 0.29 | 463 |
| 10 | o-Cresol* | 0.3 | " | 0.04 | SiCl$_4$ | 0.4 | 45.8 | 570 | 349 | 16.1 | 94.7 | 0.29 | 464 |
| 11 | 2,6-Dimethylphenol* | 0.3 | " | 0.04 | SiCl$_4$ | 0.4 | 45.7 | 575 | 307 | 12.1 | 94.9 | 0.29 | 405 |

*The reaction between magnesium chloride and the alcohol was carried out at 100° C.

EXAMPLE 12

Preparation of Catalyst Component (a)

Commercially available anhydrous magnesium chloride (0.1 mole) was suspended in 0.3 liter of kerosene, and at room temperature, 0.4 mole of ethanol was added to the suspension. Then, 0.4 mole of silicon tetrachloride was added dropwise at room temperature, and the mixture was stirred for 1 hour. Then, 0.15 mole of ethyl benzoate was added, and the temperature was raised to 70° C. The mixture was stirred for 1 hour. The supernatant was washed thoroughly with fresh kerosene. Then,

COMPARATIVE EXAMPLE 2

Propylene was polymerized in the same way as in Example 1 using a catalyst prepared in the same way as in Example 1 except that ethyl benzoate was used instead of the ethanol, and the reaction of it with the anhydrous magnesium chloride was carried out at 180° C. As a result, 73.8 g of a powdery polymer and 16.8 g of a solvent-soluble polymer were obtained. The powdery polymer had a boiling n-heptane extraction residue of only 85.1% and an apparent density of 0.15 g/ml.

The average specific polymerization activity was 58 PP-g/Ti.mM.hr.atm.

What we claim is:

1. In a process for polymerizing or copolymerizing an α-olefin containing at least 3 carbon atoms or copolymerizing said α-olefin with not more than 10 mole% of ethylene at a temperature of 20° to 200° C. and at a pressure of 1 to 50 kg/cm$^2$ in the presence of a catalyst composed of (a) a transition metal catalyst component derived from a solid carrier, an electron donor and a titanium compound and (b) an organometallic compound of a metal of Groups I to III of the Periodic Table, the component (b) being in such amount that the ratio of said metal of Groups I to III/Ti (as metal atom ratio) of the component (a) is 1/1 to 2000/1; the improvement wherein said transition metal component is obtained by reacting the following components (1) and (2):

1. a magnesium-containing reaction product of:
   i. a magnesium halide;
   ii. an active hydrogen-containing alcohol selected from the group consisting of $C_1$ - $C_8$ aliphatic alcohols, benzyl alcohol, phenethyl alcohol, cumyl alcohol, triphenyl carbinol, o-cresol, m-cresol, 2,6-dimethylphenol and β-naphthol;
   iii. an organic acid ester selected from the group consisting of an ester formed between $C_1$ - $C_8$ saturated or unsaturated aliphatic carboxylic acid which may be substituted by a halogen atom and an alcohol selected from the group consisting of $C_1$ - $C_8$ saturated or unsaturated aliphatic primary alcohols, $C_3$ - $C_8$ saturated or unsaturated alicyclic alcohols and $C_1$ - $C_4$ saturated or unsaturated aliphatic primary alcohols substituted by $C_6$ - $C_{10}$ aromatic groups or halogen atoms; an ester formed between a $C_7$ - $C_{12}$ aromatic monocarboxylic acid and an alcohol selected from the group consisting of $C_1$ - $C_8$ saturated or unsaturated aliphatic primary alcohols, $C_3$ - $C_8$ saturated or unsaturated alicyclic alcohols and $C_1$ - $C_4$ saturated or unsaturated aliphatic primary alcohols substituted by $C_6$ - $C_{10}$ aromatic groups or halogen atoms, methyl cyclopentanecarboxylate, methyl hexahydrobenzoate, ethyl hexahydrobenzoate, methyl hexahydrotoluate and ethyl hexahydrotoluate; and
   iv. a silicon or tin compound containing at least one halogen atom or hydrocarbon group directly bonded to silicon or tin and selected from the group consisting of $SiCl_3H$, $Sn(C_2H_5)_4$, $SiCl_3(OC_2H_5)$,

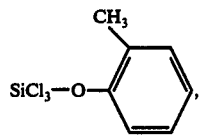

silicon tetrahalides, tin tetrahalides, tetraalkyl silicons, silicon alkyl halides, silicon alkyl hydrides, tin alkyl halides and tin hydride halides;

2. a titanium compound of the formula $Ti(OR^1)_nX_{4-n}$ where X is a halogen atom, $R^1$ is a $C_1$ - $C_4$ alkyl group, and n is a number of 0 to 4, the molar ratio of (i)/(ii)/(iii)/(iv)/(2) being 1/(20–0.1)/(20–0.005)/(at least 0.1)/(at least 0.1).

2. The process of claim 1 wherein said polymerization or copolymerization is carried out in an inert organic liquid medium using the component (a) in an amount of 0.0001 to 1.0 millimole calculated as titanium atom per liter of the inert organic liquid medium.

3. The process of claim 1 wherein said component (b) is a member selected from the group consisting of trialkyl aluminums, alkyl aluminum halides, alkyl aluminum alkoxides, alkyl aluminum aryloxides, alkyl aluminum hydrides, dialkyl zincs, dialkyl magnesiums and alkyl magnesium halides in which the alkyl is alkyl containing 1 to 12 carbon atoms and the halogen is chlorine, bromine or iodine.

4. The process of claim 1 wherein the molar ratio of the components (i)/(ii)/(iii)/(iv)/(2) is 1/(6–0.1)/(3–0.1)/(20–0.2)/(100–0.1).

5. The process of claim 1 wherein the active hydrogen-containing alcohol (ii) is a $C_1$ - $C_4$ aliphatic alcohol; the organic carboxylic acid ester (iii) is methyl acetate, ethyl acetate, ethyl propionate, methyl chloroacetate, methyl cyclohexanecarboxylate, methyl benzoate, ethyl benzoate, propyl benzoate, butyl benzoate, methyl toluate, ethyl toluate, butyl toluate, ethyl ethylbenzoate, methyl anisate, ethyl anisate or ethyl chlorobenzoate; and the Si or Sn compound (iv) is a silicon tetrahalide or tin tetrahalide.

6. The process of claim 5 wherein the ratio of the components (i)/(ii)/(iii)/(iv)/(2) is 1/(6–0.1)/(3–0.1)/(20–0.2)/(100–0.1).

7. The process of claim 6 wherein the active hydrogen-containing alcohol (ii) is methanol, ethanol, propanol or butanol; the organic carboxylic acid ester (iii) is methyl benzoate, ethyl benzoate, methyl toluate or ethyl toluate; and the Si or Sn compound (iv) is silicon tetrachloride or tin tetrachloride.

8. The method of claim 5 wherein the titanium compound (2) is selected from the group consisting of titanium tetrachloride, titanium tetrabromide, titanium tetraiodide, methoxy titanium trichloride, ethoxy titanium trichloride, n-butoxy titanium tribromide, dimethoxy titanium dichloride, diethoxy titanium dichloride, di-n-butoxy titanium dichloride, diethoxy titanium dibromide, trimethoxy titanium chloride, triethoxy titanium chloride, tri-n-butoxy titanium chloride, triethoxy titanium bromide, tetramethoxy titanium, tetraethoxy titanium and tetra-n-butoxy titanium.

9. The process of claim 6 wherein the titanium compound (2) is selected from the group consisting of titanium tetrachloride, titanium tetrabromide, titanium tetraiodide, methoxy titanium trichloride, ethoxy titanium trichloride, n-butoxy titanium tribromide, dimethoxy titanium dichloride, diethoxy titanium dichloride, di-n-butoxy titanium dicloride, diethoxy titanium dibromide, trimethoxy titanium chloride, triethoxy titanium chloride, tri-n-butoxy titanium chloride, triethoxy titanium bromide, tetramethoxy titanium, tetraethoxy titanium and tetra-n-butoxy titanium.

10. The process of claim 7 wherein the titanium compound (2) is titanium tetrachloride.

11. The process of claim 10 wherein the magnesium halide (i) is magnesium chloride.

12. A catalyst for use in polymerizing or copolymerizing α-olefins containing at least three carbon atoms or copolymerizing said α-olefins with not more than 10 mole % of ethylene, said catalyst consisting essentially of:

a. a solid transition metal catalyst component obtained by reacting the following components (1) and (2):
   1. a magnesium containing reaction product of:
      i. a magnesium halide;

ii. an active hydrogen-containing alcohol selected from the group consisting of $C_1 - C_8$ aliphatic alcohols, benzyl alcohol, phenethyl alcohol, cumyl alcohol, triphenyl carbinol, o-cresol, m-cresol, 2,6-dimethylphenol and $\beta$-naphthol;

iii. an organic acid ester selected from the group consisting of an ester formed between $C_1 - C_8$ saturated or unsaturated aliphatic carboxylic acid which may be substituted by a halogen atom and an alcohol selected from the group consisting of $C_1 - C_8$ saturated or unsaturated aliphatic primary alcohols, $C_3 - C_8$ saturated or unsaturated alicyclic alcohols and $C_1 - C_4$ saturated or unsaturated aliphatic primary alcohols substituted by $C_6 - C_{10}$ aromatic groups or halogen atoms; an ester formed between a $C_7 - C_{12}$ aromatic monocarboxylic acid and an alcohol selected from the group consisting of $C_1 - C_8$ saturated or unsaturated aliphatic primary alcohols, $C_3 - C_8$ saturated or unsaturated alicyclic alcohols and $C_1 - C_4$ saturated or unsaturated aliphatic primary alcohols substituted by $C_6 - C_{10}$ aromatic groups or halogen atoms, methyl cyclopentanecarboxylate, methyl hexahydrobenzoate, ethyl hexahydrobenzoate, methyl hexahydrotoluate and ethyl hexahydrotoluate; and iv. a silicon or tin compound containing at least one halogen atom or hydrocarbon group directly bonded to silicon or tin and selected from the group consisting of silicon tetrahalides, tin tetrahalides, tetraalkyl silicons, silicon alkyl halides, silicon alkyl hydrides, tin alkyl halides and tin hydride halides;

2. a titanium compound of the formula $Ti(OR^1)_nX_{4-n}$ where X is a halogen atom, $R^1$ is a $C_1 - C_4$ alkyl group, and $n$ is a number of 0 to 4, the molar ratio of (i)/(ii)/(iii)/(iv)/(2) being 1/(20–0.1)/(20–0.005)/(at least 0.1)/(at least 0.1); and b. an organometallic compound of a metal selected from the group consisting of aluminum, magnesium and zinc.

13. The process of claim 12 wherein said component (b) is a member selected from the group consisting of trialkyl aluminums, alkyl aluminum halides, alkyl aluminum hydrides, dialkyl zincs, dialkyl magnesiums and alkyl magnesium halides in which the alkyl is alkyl containing 1 to 12 carbon atoms and the halogen is chlorine, bromine or iodine.

14. The catalyst of claim 12 wherein the molar ratio of the components (i)/(ii)/(iii)/(iv)/(2) is 1/(6–0.1)/(3–0.1)/(20–0.2)/(100–0.1).

15. The catalyst of claim 12 wherein the active hydrogen-containing alcohol (ii) is a $C_1 - C_4$ aliphatic alcohol; the organic carboxylic acid ester (iii) is methyl acetate, ethyl acetate, ethyl propionate, methyl chloroacetate, methyl cyclohexanecarboxylate, methyl benzoate, ethyl benzoate, propyl benzoate, butyl benzoate, methyl toluate, ethyl toluate, butyl toluate, ethyl ethylbenzoate, methyl anisate, ethyl anisate or ethyl chlorobenzoate; and the Si or Sn compound (iv) is a silicon tetrahalide or tin tetrahalide.

16. The catalyst of claim 15 wherein the ratio of the components (i)/(ii)/(iii)/(iv)/(2) is 1/(6–0.1)/(3–0.1)/(20/0.2)/(100–0.1).

17. The catalyst of claim 16 wherein the active hydrogen-containing alcohol (ii) is methanol, ethanol, propanol or butanol; the organic carboxylic acid ester (iii) is methyl benzoate, ethyl benzoate, methyl toluate or ethyl toluate; and the Si or Sn compound (iv) is silicon tetrachloride or tin tetrachloride.

18. The catalyst of claim 15 wherein the titanium compound (2) is selected from the group consisting of titanium tetrachloride, titanium tetrabromide, titanium tetraiodide, methoxy titanium trichloride, ethoxy titanium trichloride, n-butoxy titanium tribromide, dimethoxy titanium dichloride, diethoxy titanium dichloride, di-n-butoxy titanium dichloride, diethoxy titanium dibromide, trimethoxy titanium chloride, triethoxy titanium chloride, tri-n-butoxy titanium chloride triethoxy titanium bromide, tetramethoxy titanium, tetraethoxy titanium and tetra-n-butoxy titanium.

19. The catalyst of claim 16 wherein the titanium compound (2) is selected from the group consisting of titanium tetrachloride, titanium tetrabromide, titanium tetraiodide, methoxy titanium trichloride, ethoxy titanium trichloride, n-butoxy titanium tribromide, dimethoxy titanium dichloride, diethoxy titanium dichloride, di-n-butoxy titanium dichloride, diethoxy titanium dibromide, trimethoxy titanium chloride, triethoxy titanium chloride, tri-n-butoxy titanium chloride, triethoxy titanium bromide, tetramethoxy titanium, tetraethoxy titanium and tetra-n-butoxy titanium.

20. The catalyst of claim 17 wherein the titanium compound (2) is titanium tetrachloride.

21. The catalyst of claim 20 wherein the magnesium halide (i) is magnesium chloride.

* * * * *